United States Patent
Schellekens et al.

(10) Patent No.: US 9,567,476 B2
(45) Date of Patent: Feb. 14, 2017

(54) WATER-BORNE CROSSLINKABLE BLOCK COPOLYMERS OBTAINED USING RAFT

(71) Applicants: Michael Arnoldus Jacobus Schellekens, Waalwijk (NL); Tijs Nabuurs, Waalwijk (NL); John Geurts, Waalwijk (NL); Gerardus Cornslis Overbeek, Waalwijk (NL)

(72) Inventors: Michael Arnoldus Jacobus Schellekens, Waalwijk (NL); Tijs Nabuurs, Waalwijk (NL); John Geurts, Waalwijk (NL); Gerardus Cornslis Overbeek, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 196 days.

(21) Appl. No.: 13/758,803

(22) Filed: Feb. 4, 2013

(65) Prior Publication Data
US 2013/0150528 A1 Jun. 13, 2013

Related U.S. Application Data

(63) Continuation of application No. 12/812,659, filed as application No. PCT/EP2009/050514 on Jan. 16, 2009, now abandoned.

(30) Foreign Application Priority Data

Jan. 27, 2008 (EP) .................................. 08000827

(51) Int. Cl.
| | | |
|---|---|---|
| *C08L 53/00* | (2006.01) | |
| *C09D 133/08* | (2006.01) | |
| *C08F 293/00* | (2006.01) | |
| *C09D 153/00* | (2006.01) | |

(52) U.S. Cl.
CPC ......... *C09D 133/08* (2013.01); *C08F 293/005* (2013.01); *C08L 53/00* (2013.01); *C09D 153/00* (2013.01); *C08F 2438/03* (2013.01); *C08L 53/005* (2013.01)

(58) Field of Classification Search
CPC ............................... C08L 53/00; C08L 53/005
See application file for complete search history.

(56) References Cited

U.S. PATENT DOCUMENTS

| | | | | |
|---|---|---|---|---|
| 6,187,854 | B1 * | 2/2001 | Spinelli et al. | 524/505 |
| 6,306,521 | B1 * | 10/2001 | Spinelli et al. | 428/522 |
| 6,437,040 | B2 * | 8/2002 | Anthony et al. | 524/505 |
| 6,825,290 | B2 * | 11/2004 | Adam et al. | 526/75 |
| 7,064,151 | B1 * | 6/2006 | Berge et al. | 521/142 |
| 7,671,152 | B2 * | 3/2010 | Parker et al. | 526/204 |
| 7,745,553 | B2 * | 6/2010 | Such et al. | 526/222 |
| 2004/0006151 | A1 * | 1/2004 | Husemann et al. | 522/134 |
| 2004/0039089 | A1 * | 2/2004 | Buckmann et al. | 524/104 |
| 2004/0242789 | A1 * | 12/2004 | Liu et al. | 525/242 |
| 2006/0142404 | A1 * | 6/2006 | Berge et al. | 521/142 |
| 2006/0223936 | A1 * | 10/2006 | Such et al. | 524/555 |
| 2007/0238824 | A1 * | 10/2007 | Smak et al. | 524/458 |
| 2007/0270510 | A1 * | 11/2007 | Liu | 516/72 |
| 2008/0051543 | A1 * | 2/2008 | Parker et al. | 526/288 |
| 2008/0306218 | A1 * | 12/2008 | Madle et al. | 525/221 |
| 2011/0021689 | A1 * | 1/2011 | Schellekens et al. | 524/505 |
| 2013/0150528 | A1 * | 6/2013 | Schellekens et al. | 524/831 |

FOREIGN PATENT DOCUMENTS

| | | |
|---|---|---|
| EP | 1 801 137 | 6/2007 |
| EP | 1 803 754 | 7/2007 |
| FR | 2 887 888 | 1/2007 |
| WO | 01/77198 | 10/2001 |

OTHER PUBLICATIONS

International Search Report for PCT/EP2009/050514, mailed Mar. 19, 2009.
Written Opinion of the International Searching Authority for PCT/EP2009/050514, mailed Mar. 19, 2009.
Ganeva et al. Macromolecules 2007, 40, pp. 6181-6189.

* cited by examiner

*Primary Examiner* — Michael A Salvitti
(74) *Attorney, Agent, or Firm* — Nixon & Vanderhye P.C.

(57) ABSTRACT

There is disclosed a process for obtaining a water-borne crosslinkable composition comprising a block copolymer comprising at least blocks $[A]_x[B]_y$ (where x is an integer from 3 to 80 (inc.), where y is an integer ≥10 and where y>x) and a polymer P, the block copolymer-polymer having an acid value ≤150 mg KOH per g of block copolymer-polymer, where at least block [A] and [B] is obtained by a controlled radical polymerisation of at least one ethylenically unsaturated monomer via a reversible addition-fragmentation chain transfer (RAFT) mechanism in solution in the presence of a control agent and a source of free radicals; and where polymer P is obtained in the presence of blocks $[A]_x[B]_y$ by an emulsion polymerisation process.

10 Claims, No Drawings

WATER-BORNE CROSSLINKABLE BLOCK COPOLYMERS OBTAINED USING RAFT

This application is a continuation of commonly owned U.S. application Ser. No. 12/812,659, filed Oct. 8, 2010 (now abandoned), which is the national phase application under 35 USC §371 of PCT/EP2009/050514, filed Jan. 16, 2009, which designated the U.S. and claims priority to European Application No. 08000827.9, filed Jan. 17, 2008, the entire contents of each of which are hereby incorporated by reference.

This invention relates to a process for obtaining a water-borne crosslinkable block copolymer and a polymer and the use of such water-borne crosslinkable block copolymer-polymers.

For coatings, crosslinking is advantageous when certain properties are required, such as improved mechanical properties, resistance against solvents or stains or improved adhesion. It has been found that especially for waterborne polymers prepared using an emulsion polymerisation process, a significant amount of crosslinkable monomers appear to be polymerised in the aqueous phase as such functional monomers often exhibit a high water solubility. As a result, there is an inhomogeneous incorporation of crosslinkable monomers, which results in ineffective intra-molecular (i.e. short) crosslinks. In addition, a large fraction of polymer chains does not contain any crosslink functionality, which gives lower crosslink densities and poor final film properties. An increase in crosslink density can be attained through the use of higher levels of crosslinkable monomers as this increases the chance of each polymer chain having at least one crosslinkable monomer incorporated. However, the use of high levels of crosslinkable monomers to achieve good final application properties such as resistance is considered undesirable from an economical point of view and can be detrimental to the final properties.

Another problem often encountered in the preparation of conventional waterborne copolymers is that the level of control over the polymer chain architecture and chain composition is often insufficient to attain the desired final application properties. For example, it may sometimes be desirable to have a crosslinking functionality in only one segment of a polymer (such as a block) and to have a different monomer composition in another segment of the polymer, where often the second segment will have a specific functionality, such as for example water repellence or adhesion promotion. This will often be the case when the goal is to make compatibilisers, in which case the composition of each polymer segment in general will be quite different and different types of crosslink functionalities may be used in each segment.

Furthermore often a combination of good resistances and elasticity is desirable, for example when any resultant coatings are used on flexible or natural (wood, leather) substrates. On substrates on which it may be difficult for coatings to adhere there is often a desire to apply coatings that combine good resistances with good adhesion.

However, crosslinking will often have a negative effect on adhesion.

It would be desirable to have a process that allows the preparation of water-borne polymers with defined macromolecular structure and composition, where each chain has some crosslink functionality, and where the obtained polymer composition can provide the desired combination of application properties like good film formation, good mechanical properties and good adhesion.

There is an increased scope of polymerisation methods available for adaptation to polymerisations to make solvent-borne polymers. In particular controlled radical polymerisation techniques such as nitroxide mediated radical polymerisation (NMP), atom transfer radical polymerisation (ATRP), and degenerative transfer techniques such as reversible addition-fragmentation chain transfer (RAFT) polymerisation have been investigated as means to control polymer chain composition and architecture.

DE102004044087 discloses a functionalised polymer or contact adhesive containing functionalised polymer(s) with a high content of functional/crosslinkable monomer units and a special molecular weight distribution in which the difference between peak molecular weight and minimum molecular weight is preferably less than 15000.

DE102004023637 discloses the preparation of cross-linked pressure-sensitive adhesives comprises two-stage or multi-stage free-radical addition polymerization of at least two copolymerizable monomers in the presence of a polyvalent mercaptan(s), producing block copolymers containing a polyvalent thioether unit(s); coating of the polymer from the melt on a backing; and crosslinking of the polymer on the backing by irradiation with ultraviolet radiation.

WO03/055919 discloses a method for preparing an aqueous dispersion of polymer particles comprising preparing a dispersion having a continuous aqueous phase, a dispersed organic phase comprising one or more ethylenically unsaturated monomers, and an amphiphilic RAFT agent as a stabiliser for said organic phase, and polymerising said one or more ethylenically unsaturated monomers under the control of said amphiphilic RAFT agent to form said aqueous dispersion of polymer particles.

WO 01/77198 (Du Pont) discloses block copolymers prepared by RAFT in which one block must be insoluble to form a dispersion of micelles. There is no disclosure of an preparing an additional polymer in the presence of the block copolymer.

EP 1801127 (Goodyear) describes amphiphillic block copolymers prepared by RAFT in aqueous media and without a polymeric surfactant. These copolymers are not homogenous as not all the blocks are prepared in the same solvent.

US2004/0006151 discloses a hot melt pressure sensitive adhesive which is solvent borne and comprises a P(A/C)-P(B)-P(A/C) block copolymer, wherein P(B) is a polymer formed from component B and component B comprises at least one monomer B1, P(B) having a glass transition temperature not higher than 0° C., P(A/C) represents a copolymer block of component A/C, which comprises at least two monomers A1 and C1, P(A/C) having a glass transition temperature of 20° C. to 175° C. and C1 comprises at least one crosslinking-enabled functional group. Neither the polymer P(A/C) nor P(B) are made by emulsion polymerization.

EP 1803754 (Cordis) describes block copolymers that may be prepared by RAFT, having hydrophilic, hydrophobic and biologically active blocks and are used to coat medical devices. These compositions are cross-linked photoactively and the polymers are not made by emulsion polymerisation.

Lubnin et. al in Surface Coatings Intern. Part B: Coatings Transactions, 2006, vol. 89 B4, pages 269-380) report on the polymerization of a DAAM containing monomer mixture via a solution/dispersion process. The DAAM containing monomer mixture (MMA/BA/DAAM/MAA=50/38/8/4) was polymerised with AMBN in either EtOH or IPA in the presence of a dithiocarbamate RAFT agent to obtain a random copolymer.

Monteiro in Macromol. Rapid Commun. 2002, 23, 370-374 reports on RAFT block copolymers containing acetoacetoxyethyl methacrylate (AAEM) in the form of an XY block copolymer, with Y=styrene and X=BA-co-AAEM, by performing RAFT emulsion polymerization mediated by xanthates.

We have surprisingly found that according to the present invention the reversible addition-fragmentation chain transfer (RAFT) polymerisation process provides a useful route for making crosslinkable block copolymers that contain a crosslinkable block next to at least a second, different, block. These block copolymers can provide water-borne coatings with advantageous crosslinking properties without the need of high levels of costly crosslinking functional monomers. RAFT polymerisation performed in for example a homogeneous solution avoids the undesirable homopolymerisation of crosslinkable monomers with a high water solubility and provides the possibility to fully control the polymer chain composition and the chain architecture of water-based crosslinkable polymers. By making an [A][B] type of block copolymer, preferably followed by preparing a polymer P, the above problems may be mediated, and waterborne polymer compositions having the desired combination of application properties like for example good film formation, good mechanical properties and good adhesion can be obtained.

According to the invention there is provided a process for obtaining a water-borne non-biologically active crosslinkable composition comprising a block copolymer comprising at least blocks $[A]_x[B]_y$ and a polymer P, the block copolymer-polymer composition having an acid value ≤150 mgKOH per g of block copolymer-polymer, where at least block [A] and [B] is obtained by a controlled radical polymerisation of at least one ethylenically unsaturated monomer via a reversible addition-fragmentation chain transfer (RAFT) mechanism in solution in the presence of a control agent and a source of free radicals;
where block [A] comprises:
  i) 0 to 50 mol %, preferably 0 to 20 mol % of ethylenically unsaturated monomer units bearing crosslinking functional groups;
  ii) 50 to 100 mol % ethylenically unsaturated monomer units bearing water-dispersing functional groups;
  iii) 0 to 50 mol % of ethylenically unsaturated monomers units selected from $C_{1-18}$ alkyl (preferably $C_{1-12}$ alkyl) (meth)acrylate monomers and styrenic monomers;
  iv) 0 to 35 mol %, preferably 0 to 20 mol %, of ethylenically unsaturated monomers units different from those from i), ii)+ iii);
  where i), ii), iii)+ iv) add up to 100%;
  block [A] has a Hansch parameter<1.5; and
  block [A] has an average degree of polymerisation x, where x is an integer from 3 to 80;
where block [B] comprises:
  i) 5 to 80 mol % of ethylenically unsaturated monomer units bearing crosslinking functional groups;
  ii) 0 to 20 mol % of ethylenically unsaturated monomer units bearing water-dispersing functional groups;
  iii) 20 to 95 mol % of ethylenically unsaturated monomers units selected from $C_{1-18}$ alkyl (preferably $C_{1-12}$ alkyl) (meth)acrylate monomers and styrenic monomers;
  iv) 0 to 35 mol % preferably 0 to 20 mol %, of ethylenically unsaturated monomers units different from those from i), ii)+ iii);
  where i), ii), iii)+ iv) add up to 100%;
  block [B] has a Hansch parameter≥1.5; and
  block [B] has an average degree of polymerisation y, where y is an integer ≥10, where y>x;
  and
where the polymer P is obtained in the presence of the block copolymer by an emulsion polymerization process; and comprises:
  i) 0 to 5 wt % of ethylenically unsaturated monomer units bearing crosslinking functional groups;
  ii) 0 to 5 wt % of ethylenically unsaturated monomer units bearing water-dispersing functional groups;
  iii) 80 to 100 wt % of ethylenically unsaturated monomers units selected from $C_{1-18}$ alkyl (preferably $C_{1-12}$ alkyl) (meth)acrylate monomers and styrenic monomers;
  iv) 0 to 10 wt % of ethylenically unsaturated monomers units different from those from i), ii)+ iii);
where i), ii), iii)+ iv) add up to 100%.

The average degree of polymerisation x (or y) is determined by the total molar amount of monomers in block [A] (or [B]) divided by the total molar amount of control (RAFT) agent.

Preferably the crosslinkable block copolymer-polymer composition obtained by the process of the invention has an acid value ≤100 and more preferably ≤50 mgKOH per g of block copolymer-polymer.

Preferably the block copolymer part of the crosslinkable block copolymer-polymer has an acid value from 15 to 200 mg KOH per g of block copolymer.

Preferably the polymer part of the crosslinkable block copolymer-polymer obtained by the process of the invention has an acid value ≤50, more preferably <15 and especially <10 mgKOH per g of polymer.

Preferably the crosslinkable block copolymer-polymer obtained by the process of the invention comprises 2 to 65 wt % of block [A] and 35 to 98 wt % of block [B] based on the weight of blocks [A] and [B].

Preferably the crosslinkable block copolymer-polymer composition obtained by the process of the invention comprises 0.5 to 50 wt %, more preferably 2 to 40 wt % and most preferably 3 to 35 wt % of blocks [A][B] together, based on the weight of blocks [A][B] and polymer P.

Preferably integer x is from 3 to 80, more preferably from 5 to 50, most preferably from 5 to 40.

Preferably integer y is from 10 to 400, more preferably from 10 to 200, most preferably from 10 to 150.

The crosslinkable block copolymer-polymer composition obtained from the process of the invention may contain low amounts of crosslinking monomers and yet the physical properties can still be dominated by the crosslinking monomers despite the low amounts.

The product formed after the emulsion polymerization of polymer P in the presence of the block copolymer comprising blocks $[A]_x[B]_y$. may exist in different embodiments each of which is encompassed by the terms 'block copolymer-polymer composition' and 'block copolymer-polymer' as used herein. Without wishing to be bound by any theory non-limiting embodiments include where the block copolymer-polymer may comprise a physical mixture of polymer P and the copolymer [A][B] (or regions thereof) where these ingredients are in intimate contact but not substantially covalently bonded to each other, the polymer P may be obtained in whole or in part from unreacted monomers [A] and/or [B] present in the copolymer; moiet(ies) of the polymer P and copolymer [A][B] may from bonds directly during the emulsion polymerization to form (optionally additional) crosslinking of the composition; suitable combinations or any of the aforementioned, and/or other possibilities which will be well understood by a person skilled in the art. It is preferred that the copolymer and polymer P form at least some covalent bonds.

The terms monomer, polymer, block copolymer, control agent, initiator, block are intended to cover the singular as well as the plural.

The term "comprising" as used herein will be understood to mean that the list following is non exhaustive and may or may not include any other additional suitable items, for example one or more further feature(s), component(s), ingredient(s) and/or substituent(s) as appropriate.

The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

The terms 'optional substituent' and/or 'optionally substituted' as used herein (unless followed by a list of other substituents) signifies the one or more of following groups (or substitution by these groups): carboxy, sulfo, sulfonyl, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulfonyl if directly attached to each other represent a sulfamoyl group). Preferred optional substituents comprise: carboxy, sulfo, hydroxy, amino, mercapto, cyano, methyl, halo, trihalomethyl and/or methoxy, more preferred being methyl, chloro, hydroxy and carboxy.

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example a 'C1-N moiety' signifies a moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective in the applications described herein.

As used herein chemical terms (other than names for specifically identified compounds) which comprise features which are given in parentheses—such as (alkyl)acrylate, (meth)acrylate and/or (co)polymer denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may (unless the context herein indicates otherwise) exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non stoichiometric complexes, π adducts, solvates and/or hydrates); isotopically substituted forms, polymeric configurations [such as homo or copolymers, random, graft and/or block polymers, linear and/or branched polymers (e.g. star and/or side branched), cross linked and/or networked polymers, polymers obtainable from di and/or tri valent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective in the applications described herein.

The values given herein for each of the parameters used to define the invention (such as integers x and y) when given as a range include the numbers at both ends of each range.

A block copolymer is understood to be a copolymer comprising at least two successive sections of blocks of monomer units of different chemical constitutions. The block copolymers of the invention can therefore be diblock, triblock or multiblock copolymers. Block copolymers may be linear, branched, star or comb like, and have structures like [A][B], [A][B][A], [A][B][C], [A][B][A][B], [A][B][C][B] etc. Preferably the block copolymer is a linear diblock copolymer of structure [A][B], or a linear triblock copolymer of structure [A][B][A]. Block copolymers may have multiple blocks [A], [B] and optionally [C] in which case the block copolymer is represented as for example $[A]_x[B]_y$ or $[A]_x[B]_y[C]_z$, where x, y and z are the degrees of polymerisation (DP) of the corresponding blocks [A], [B] or [C].

Furthermore any of the blocks in the block copolymer could be either a homopolymer, meaning only one type of monomer, or a copolymer, meaning more than one type of monomer. In case of a copolymer type of block the composition could be either random or gradient like, depending on the processing conditions used. A block with a gradient composition is understood to be a block having a continuously changing monomer composition along the block.

The block copolymer may be oligomeric comprising only a few repeat units (such as up to 10) where typically any change in the number of repeat units may significantly affect the overall properties of the oligomer. Alternatively the block copolymer may be a polymer with many more repeat units in which typically a small change in the number of repeat units in the polymer has little or no effect on the polymer's properties.

The term "controlled radical polymerisation" is to be understood as a specific radical polymerisation process, also denoted by the term of "living radical polymerisation", in which use is made of control agents, such that the polymer chains being formed are functionalised by end groups capable of being reactivated in the form of free radicals by virtue of reversible transfer or reversible termination reactions.

Controlled radical polymerisation processes in which reversible deactivation of radicals proceeds by reversible transfer reactions include for example the process for radical polymerisation controlled by control agents, such as reversible transfer agents of the dithioester (R—S—C(=S)—R') type as described in WO98/01478 and WO99/35178, the process for radical polymerisation controlled by reversible transfer agents of trithiocarbonate (R—S—C(=S)—S—R') type as described in for example WO98/58974, the process for radical polymerisation controlled by reversible transfer agents of xanthate (R—S—C(=S)—OR') type as described in WO98/58974, WO00/75207 and WO01/42312, and the process for radical polymerisation controlled by reversible transfer agents of dithiocarbamate (R—S—C(=S)—NR$_1$R$_2$) type as described for example in WO99/31144 and WO99/35177.

Such controlled radical polymerisations are known in the art as reversible addition-fragmentation chain transfer (RAFT) polymerisation (WO98/01478; Macromolecules 1998 31, 5559-5562) or macromolecular design via interchange of xanthates (MADIX) polymerisation (WO98/58974; Macromolecular Symposia 2000 150, 23-32).

"Addition-fragmentation" is a two-step chain transfer mechanism wherein a radical addition is followed by fragmentation to generate a new radical species.

When preparing for example a block copolymer in the presence of the control agent, the end of the growing block is provided with a specific functionality that controls the growth of the block by means of reversible free radical deactivation. The functionality at the end of the block is of such a nature that it can reactivate the growth of the block in a second and/or third stage of the polymerisation process with other ethylenically unsaturated monomers providing a covalent bond between for example a first and second block [A] and [B] and with any further optional blocks.

Preferably the chain end functionality of block copolymer [A]$_x$[B]$_y$ is retained to assist with the covalent bond formation between block copolymer [A]$_x$[B]$_y$ and any further optional blocks and or polymer P.

Preferably the block copolymer is obtained from a controlled radical polymerisation process employing as a control agent, a reversible transfer agent.

Reversible transfer agents may be one or more compounds selected from the group consisting of dithioesters, thioethers-thiones, trithiocarbonates, dithiocarbamates, xanthates and mixtures thereof.

Reversible transfer agents also include symmetrical transfer agents with two functional groups. An example is a dibenzyltrithiocarbonate such as

C$_6$H$_5$CH$_2$—S—C(=S)—S—CH$_2$C$_6$H$_5$.

Control agents of the xanthate type have low transfer constants in the polymerisation of styrenes and in particular methacrylate type monomers which may result in a higher polydispersity and/or poor chain growth control of the resultant vinyl polymers and may be considered as less effective RAFT control agents, although the actual mechanism involved is similar to the reversible-addition fragmentation chain transfer (RAFT) mechanism described in WO 98/01478. Reversible transfer agents of the dithioester type like for example benzyl dithiobenzoate derivatives are generally considered as having a high transfer constant and being more effective RAFT control agents.

Transfer constants are described in WO98/01478. "Chain transfer constant" ($C_{tr}$) means the ratio of the rate constant for chain transfer ($k_{tr}$) to the rate constant for propagation ($k_p$) at zero conversion of monomer and chain transfer agent (CTA). If chain transfer occurs by addition-fragmentation, the rate constant for chain transfer ($k_{tr}$) is defined as follows:

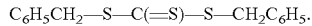

$k_{tr}=k_{add} \times [k_\beta/(k_{-add}+k_\beta)]$ where $k_{add}$ is the rate constant for addition to the CTA and $k_{-add}$ and $k_\beta$ are the rate constants for fragmentation in reverse and forward directions respectively.

In an embodiment of the invention the control agent preferably has a transfer constant $C_{tr}=(k_{add}/k_p)[k_\beta/(k_{-add}+k_\beta)]$ of less than 50, more preferably less than 20 and most preferably below 10.

Preferably the block copolymer is obtained from a controlled radical polymerisation process employing a control agent having a group with formula —S—C(=S)—.

Preferably the block copolymer is obtained from a controlled radical polymerisation process employing xanthates and/or dibenzyltrithiocarbonate.

Preferably the block copolymer is obtained from a controlled radical polymerisation process employing a xanthate such as O-ethyl-S-(1-methoxycarbonyl)ethyl dithiocarbonate [RSC(=S)—OC$_2$H$_5$ where R=—CH(CH$_3$)—C(=O)—OCH$_3$].

For clarity, control agents for use in RAFT do not include diphenylethylene, which although it is a control agent can not be used as a RAFT control agent, i.e. for a RAFT polymerization mechanism.

Examples of crosslinking functional groups include groups which can for example take part in auto-oxidation, Schiff base crosslinking, and silane condensation reactions. Other crosslinking mechanisms known in the art include those provided by the reaction of epoxy groups with amino, carboxylic acid or mercapto groups, the reaction of mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylenediamine or multifunctional amine terminated polyalkylene oxides) with [beta]-diketo (for example acetoacetoxy or acetoamide) groups to form enamines.

By crosslinking by auto-oxidation is meant that crosslinking results from an oxidation occurring in the presence of air and usually involves a free radical mechanism and is preferably metal-catalysed resulting in covalent crosslinks. By Schiff base crosslinking is meant that crosslinking takes place by the reaction of a carbonyl functional group(s), where by a carbonyl functional group herein is meant an aldo or keto group and includes an enolic carbonyl group such as is found in an acetoacetyl group with a carbonyl-reactive amine and/or hydrazine (or blocked amine and/or blocked hydrazine) functional group. By silane condensation is meant the reaction of alkoxy silane or —SiOH groups in the presence of water, to give siloxane bonds by the elimination of water and/or alkanols (for example methanol) during the drying of the aqueous coating composition.

Examples of component i) include ethylenically unsaturated monomer units (preferably having at least 3 carbon atoms e.g. from 3 to 30 carbon atoms) bearing crosslinking functional groups such as hydroxyl, carboxy, silane, anhydride, epoxy, acetoacetoxy, unsaturated fatty acid, (meth)acryloyl, (meth)allyl, acid amide, isocyanato, keto and or aldehyde functional groups, more preferably ethylenically unsaturated monomer units (optionally C$_{1-18}$ethylenically unsaturated monomer(s)) bearing hydroxyl, carboxyl and or epoxy functional groups. Examples of monomer units bearing crosslinking functional groups include acetoacetoxyethyl methacrylate, methylvinylketone, diacetone acrylamide, (meth)acroleine, maleic anhydride, glycidyl(meth)acrylate, alkoxysilane monomers such as gamma-methacryloxypropyl trimethoxysilane, (meth)acrylic acid, hydroxyalkyl(meth)acrylates such as hydroxyethyl(meth)acrylate, 2-hydroxypropyl(meth)acrylate, 4-hydroxybutyl (meth)acrylate and their modified analogues like Tone M-100 (Tone is a trademark of Union Carbide Corporation), and/or mixtures thereof.

Preferably the ethylenically unsaturated monomer units bearing crosslinking functional groups are selected from the group of diacetone acrylamide and hydroxyalkyl(meth)acrylates.

For clarity, monomers which may also provide some water-dispersing properties, may comprise hydroxyalkyl (meth)acrylates such as hydroxyethyl(meth)acrylate (HE(M)A), are considered herein as ethylenically unsaturated monomers providing crosslinking functional groups.

Examples of component i) also include multi-ethylenically unsaturated monomers such as allyl acrylate.

Preferably block [A] comprises 0 to 30 mol %, more preferably 0 to 20 mol %, most preferred 0 to 10 mol % and especially preferred 0 mol % of component i).

Preferably block [B] comprises 7 to 50, more preferably 10 to 35 mol % of component i).

Examples of component ii) include ethylenically unsaturated monomer units (preferably having at least 3 carbon atoms e.g. from 3 to 20 carbon atoms) bearing non-ionic, ionic or potentially ionic water-dispersing functional groups. Preferably the water-dispersing functional groups bearing ionic or potentially ionic functional groups need to be in their dissociated (i.e. salt) form to effect their water-dispersing action. If they are not dissociated they are considered as potential ionic groups which become ionic upon dissociation. The ionic water-dispersing groups are preferably fully or partially in the form of a salt in the final composition of the invention. Ionic or potentially ionic water-dispersing groups include cationic water-dispersing groups such as basic amine groups, quaternary ammonium groups, and anionic water-dispersing groups such as acid groups, for example phosphoric acid groups, sulfonic acid groups, and carboxylic acid groups.

There are also potentially ionic functional monomers that may become cationic upon addition of acid, such as dimethylamino ethyl(meth)acrylate, dimethylamino propyl (meth)acrylate, and dimethylamino propyl(meth)acrylamide. Such potentially ionic functional monomers may contribute to improved adhesion and may also improve stability or appearance on specific substrates such as wood.

Preferably any ionic water-dispersing groups are anionic water dispersing groups.

Preferred ethylenically unsaturated monomer units bearing ionic or potentially ionic water-dispersing functional groups include (meth)acrylic acid, itaconic acid, maleic acid, β-carboxyethyl acrylate, monoalkyl maleates (for example monomethyl maleate and monoethyl maleate), citraconic acid, styrene sulfonic acid, sodium styrene sulfonate, vinylbenzylsulfonic acid, vinylsulfonic acid, sodium vinylsulfonate, acryloyloxyalkyl sulfonic acids (for example acryloyloxymethyl sulfonic acid), 2-acrylamido-2-alkylalkane sulfonic acids (for example 2-acrylamido-2-methylethanesulphonic acid), 2-methacrylamido-2-alkylalkane sulfonic acids (for example 2-methacrylamido-2-methylethanesulfonic acid), mono(acryloyloxyalkyl) phosphates (for example, mono(acryloyloxyethyl)phosphate and mono(3-acryloyloxypropyl)phosphates) and mono (methacryloyloxyalkyl)phosphates, and/or mixtures thereof.

For clarity, monomers which may also provide some crosslinking properties such as (meth)acrylic acid, herein are considered as monomers providing water-dispersing functional groups.

Ethylenically unsaturated monomer units bearing water-dispersing functional groups may also include ethylenically unsaturated monomer units bearing non-ionic water dispersing groups such as pendant polyoxyalkylene groups, more preferably polyoxyethylene groups such as methoxy(polyethyleneoxide(meth)acrylate), hydroxy polyethylene glycol (meth)acrylates, alkoxy polypropylene glycol(meth)acrylates and hydroxy polypropylene glycol(meth)acrylates, preferably having a number average molecular weight of from 350 to 3,000 g/mol. Examples of such ethylenically unsaturated monomers which are commercially available include wω-methoxypolyethylene glycol(meth)acrylate. Other vinyl monomers providing non-ionic water dispersible groups include (meth)acrylamidemono(methacryloyl oxethyl)phosphate and acrylamide.

Preferably ethylenically unsaturated monomer units bearing water-dispersing functional groups are selected from the group consisting of ionic water-dispersing or potentially ionic water-dispersing functional groups with a pKa<4.5, non-ionic water-dispersing groups and mixtures thereof.

Preferably block [A] comprises 0 to 35 mol %, more preferably 0 to 25 mol % and most preferably 2 to 20 mol % of ethylenically unsaturated monomer units bearing non-ionic water dispersing groups.

Preferably block [B] comprises 0 to 16 mol %, more preferably 0 to 12 mol % and most preferably 2 to 7 mol % of ethylenically unsaturated monomer units bearing non-ionic water dispersing groups.

Preferably block [A] comprises 70 to 100, more preferred 75 to 95 mol % of component ii).

Preferably block [B] comprises 0 to 10 mol % of component ii).

Examples of component iii); comprise alkyl(meth)acrylates (such as $C_{1-30}$alkyl(meth)acrylates) and/or styrenic monomers (such as $C_{7-18}$styrenic monomers). Suitable monomers include; styrene, α-methyl styrene, t-butyl styrene, chloromethyl styrene, vinyl toluene; and esters of acrylic acid and methacrylic acid of formula $CH_2=CR^5-COOR^4$ wherein $R^5$ is H or methyl and $R^4$ is optionally substituted alkyl, cycloalkyl, aryl or (alkyl)aryl (such as optionally substituted $C_{1-18}$alkyl, $C_{3-18}$cycloalkyl, $C_{3-18}$aryl or $C_{4-18}$(alkyl)aryl) which are also known as acrylic monomers. Examples of suitable acrylic monomers are methyl (meth)acrylate, ethyl(meth)acrylate, propyl(meth)acrylate (all isomers), butyl(meth)acrylate (all isomers), 2-ethylhexyl (meth)acrylate, isodecyl(meth)acrylate, lauryl(meth)acrylate, tridecyl(meth)acrylate, isobornyl(meth)acrylate, dicyclopentenyloxymethyl(meth)acrylate, benzyl(meth)acrylate, 2-phenoxyethyl(meth)acrylate, 3,3,5-trimethyl-cyclohexyl (meth)acrylate, p-methylphenyl(meth)acrylate, 1-naphtyl (meth)acrylate, 3-phenyl-n-propyl(meth)acrylate; and hydrophobic acrylic monomers such as side-chain crystallisable monomers, examples of which are tetradecyl(meth) acrylate, hexadecyl(meth)acrylate, octadecyl(meth) acrylate (=stearyl(meth)acrylate); and mixtures thereof. Preferably, the monomers are selected from styrene, and the group of $C_{1-12}$ alkyl(meth)acrylate monomers including methyl(meth)acrylate, ethyl(meth)acrylate, propyl(meth) acrylate (all isomers), butyl(meth)acrylate (all isomers), 2-ethylhexyl(meth)acrylate, and isobornyl(meth)acrylate.

Examples of component iv) comprise diene monomers preferably $C_{2-18}$ diene monomers such as 1,3-butadiene and isoprene; divinyl benzene; vinyl monomers preferably $C_{2-18}$ vinyl monomers such as acrylonitrile, methacrylonitrile; vinyl halides preferably $C_{2-18}$ vinyl halides such as vinyl chloride; vinylidene halides preferably $C_{2-18}$ vinylidene halides such as vinylidene chloride; vinyl esters preferably $C_{2-18}$ vinyl esters such as vinyl acetate, vinyl propionate, vinyl laurate; vinyl esters of versatic acid such as VEOVA™

9 and VEOVA™ 10 (VEOVA™ is a trademark of Resolution); heterocyclic vinyl compounds preferably $C_{3-18}$ vinyl heterocycles; alkyl esters of mono-olefinically unsaturated dicarboxylic acids, preferably $C_{1-18}$ alkyl esters such as di-n-butyl maleate and di-n-butyl fumarate; amides of unsaturated carboxylic acids preferably $C_{1-18}$ amides such as N-alkyl(meth)acrylamides that are different from those of components i) to iii).

Component iv) also includes ethylenically unsaturated monomer units bearing (wet) adhesion promoting functional groups such as (optionally substituted) amine or urea groups, for example cyclic ureido groups, imidazole groups, pyridine groups, hydrazide or semicarbazide groups.

Preferred examples of adhesion promoting monomers include (optionally substituted) amine functional monomers like dimethylamino ethyl(meth)acrylate, and ureido functional monomers like N-(2-methacryloyloxyethyl)ethylene urea (Plex 6852-O available from Degussa) or N-(2-methacrylamidoethyl)ethylene urea (Sipomer WAM II available from Rhodia).

The Tg of a polymer herein stands for the glass transition temperature and is well known to be the temperature at which a polymer changes from a glassy, brittle state to a rubbery state. Tg values of polymers may be determined experimentally using techniques such as Differential Scanning calorimetry (DSC) or calculated theoretically using the well-known Fox equation where the Tg (in Kelvin) of a copolymer having "n" copolymerised comonomers is given by the weight fractions "W" and the Tg values of the respective homopolymers (in Kelvin) of each comonomer type according to the equation "$1/Tg = W_1/Tg_1 + W_2/Tg_2 + \ldots W_n/Tg_n$".

The calculated Tg in Kelvin may be readily converted to ° C.

Preferably the calculated Tg of block [A] is in the range of from −20 to 250° C., most preferably 0 to 150° C. and especially 10 to 110° C.

Preferably the calculated Tg of block [B] is in the range of from −100° C. to 150° C., most preferably −80 to 110° C. and especially −60 to 80° C. Preferably the calculated Tg of polymer P is >0° C., more preferably >5° C. and most preferably >10° C.

The weight average molecular weights (Mw) or number average molecular weights (Mn) of the block copolymer may be determined by using gel permeation chromatography (GPC) with THF as a solvent and polystyrene standards.

Preferably the number average molecular weight (Mn) of the block copolymer is in the range of from 1,000 to 50,000 g/mol, more preferably 5,000 to 35,000 g/mol and most preferably 7,000 to 25,000 g/mol.

Preferably the weight average molecular weight (Mw) of the block copolymer is in the range of from 1,000 to 50,000 g/mol, more preferably 5,000 to 35,000 g/mol and most preferably 7,000 to 25,000 g/mol.

Preferably the weight average molecular weight of the polymer P is ≥55,000, more preferably ≥80,000 and most preferably ≥100,000 g/mol.

Preferably block [B] and polymer P are more hydrophobic than block [A]. The hydrophobicity of a polymer may be determined by the Hansch parameter. The Hansch parameter for a polymer is calculated using a group contribution method. The monomer units forming a polymer are assigned a hydrophobicity contribution and the hydrophobicity of the polymer, the Hansch parameter, is calculated based on the weight average of the monomers in the polymer as disclosed in for example C. Hansch, P. Maloney, T. Fujita, and R. Muir, Nature, 194. 178-180 (1962). Values of the hydrophobicity contributions for several monomers are for example: styrene 4.29, α-methylstyrene 4.7, methyl methacrylate 1.89, butyl acrylate 3.19, and acrylic acid −2.52. Therefore a polymer made up of STY (20) αMS (20) MMA (20) BA (10) AA (30) has a Hansch value of 1.74.

Preferably the Hansch parameter for block [A] is lower than that for block [B] and lower than that for polymer P.

Preferably block [A] has a Hansch parameter≤1.2, more preferably ≤1.0, most preferably ≤0.8 and especially ≤0.6.

Preferably block [B] has a Hansch parameter≥1.7, more preferably ≥2.0 and especially ≥2.2.

Preferably polymer P has a Hansch parameter≥2.2, more preferably ≥2.5 and especially ≥2.7.

The RAFT polymerisation process for obtaining block [A] and [B] is performed in solution. Solution polymerisation is a polymerisation process in which all the reaction components including the monomer(s), initiator and control agent are dissolved in a non-monomeric liquid solvent at the start of the reaction. By non-monomeric is meant a solvent that does not comprise monomers, in other words that won't react as part of the polymerisation. Usually the solvent is also able to dissolve the polymer or copolymer that is being formed. By a solvent is meant water, organic solvents or mixtures thereof.

Preferred organic solvents include alcohols (such as ethanol, isopropanol, n-butanol, n-propanol, cyclohexanol), esters (such as ethyl acetate, propyl acetate, isopropyl acetate, butyl acetate), ketone solvents (such as acetone, methyl ethyl ketone, methyl isobutyl ketone), and glycols (such as butyl glycol). More preferred organic solvents include solvents selected from the group consisting of acetone, ethanol, methyl ethyl ketone, iso-propanol, ethyl acetate, butyl glycol and mixtures thereof. Preferably the solvent is a mixture of water and a suitable organic solvent like an alcohol. Preferably the solvent applied for the block copolymer preparation using the solution dispersion polymerisation process comprises an organic solvent with a low boiling point and or a high evaporation rate to allow fast removal of the organic solvent after the dispersion step under reduced pressure. Examples of such solvents include acetone, ethanol, isopropanol, methyl ethyl ketone and ethyl acetate.

Preferably the block copolymer is dispersed in water. Dispersion of the block copolymer in water can be performed by adding water to the block copolymer solution or by adding the block copolymer solution to water. Optionally suitable surfactants can be used to aid in the dispersion process. The block copolymer preferably comprises acid-functional groups that can be transformed into anionic functional water-dispersing groups by addition of a suitable organic or inorganic base such as for example ammonia, triethylamine or sodium hydroxide. Preferred bases are volatile amines, such as ammonia, or neutralising agents which decompose without leaving inorganic residues which are sensitive to water in the final dried coating. After the block copolymer is dispersed in water the remaining solvent can optionally be removed for example under reduced pressure.

A process for preparing a block having a gradient composition comprises continually introducing a first monomer feed to a reactor, where the first monomer feed continually varies in its compositional feed content during the continuous introduction by the addition of a different second monomer feed to the first monomer feed and polymerising the monomers introduced into the reactor.

The addition of the second monomer feed to the first monomer feed may be in parallel to the introduction of the first monomer feed to the polymerisation (i.e. both feeds start and end at the same time). Alternatively the start of monomer feed one to the reactor may precede the start of the addition of the second monomer feed to the first monomer feed, or both monomer feeds may be started simultaneously but the time taken for the addition of the second monomer feed to the first monomer feed may exceed the time taken for the introduction of the first monomer feed to the reactor.

A block having a gradient composition may also be obtained by the simultaneous introduction of a first and a second monomer feed into the reactor where the rate of the introduction of the first monomer feeds varies with respect to the rate of the introduction of the second monomer feed.

The at least two monomer feeds used to prepare the block having a gradient composition usually differ in composition. The difference between the at least two monomer feeds may be for example a difference in monomer composition, a difference in glass transition temperature (Tg), or simply a variation in the concentration of the respective monomers in each monomer feed.

Polymer P is prepared using a radical emulsion polymerisation process in the presence of the block copolymer $[A]_x[B]_y$, where optionally the control agent functional group located at one of the chain ends of the prepared block copolymer $[A]_x[B]_y$ can be deactivated or removed prior to the preparation of polymer P. General methods for preparing aqueous vinyl polymers are reviewed in the Journal of Coating Technology, volume 66, number 839, pages 89 to 105 (1995). The control agent may optionally be removed before or after dispersion of the block copolymer and before or after the polymer preparation. Preferably the control agent is removed before dispersion of the block copolymer. When a RAFT agent is used as control agent the RAFT group can be deactivated or removed via for example oxidation reactions, radical induced reactions, hydrolysis, or aminolysis. In the case that the control agent functional group is not removed or only partially removed prior to the preparation of polymer P at least part of the polymer P chains will grow onto or become covalently attached to at least part of the block copolymer chains.

Optionally the chain end functionality of the block copolymer $[A]_x[B]_y$, is retained to assist with the covalent bond formation between the block copolymer and polymer P. The chain end functionality of the block copolymer may be a RAFT group (—S—C(=S)—) or a thiol (—SH) group or any other group derived from the RAFT control agent that can provide covalent bond formation between the block copolymer and polymer P.

In another embodiment of the invention there is provided a process for preparing a composition according to the invention wherein said method comprises the following steps:
a) synthesis in a solvent by means of a RAFT radical polymerisation process of a first block [A] followed by the polymerisation of at least a second block [B]. The order of preparation of [A] and [B] can also be reversed;
b) optional removal of the control agent before, during or after dispersing the block copolymer $[A]_x[B]_y$ in water;
c) optional removal of the solvent from block copolymer $[A]_x[B]_y$;
d) dispersion of the block copolymer $[A]_x[B]_y$ in water optionally containing monomers, by adding either water to the block copolymer $[A]_x[B]_y$ or adding the block copolymer $[A]_x[B]_y$ to water, optionally using surfactants, preferably by addition of a suitable base;
e) optional removal of solvent from the block copolymer $[A]_x[B]_y$ dispersion (if solvent is still present from step 4.);
f) performing an emulsion polymerisation process of monomers in the presence of the block copolymer $[A]_x[B]_y$ dispersion prepared in step 4 and or step 5 to obtain polymer P.

Alternatively after step "a" the solvent is removed by a suitable method to get a solid, which solid can be afterwards dispersed into water.

Furthermore the polymerisation process to make the block copolymer or the polymer may be carried out as either a batch, semi-batch or a continuous process. When the polymerisation process for the block copolymer is carried out in the batch mode, the reactor is typically charged with control agent and monomer. To the mixture is then added the desired amount of initiator. The mixture is then heated for the required reaction time. In a batch process, the reaction may be run under pressure to avoid monomer reflux.

Semi-batch operation typically involves the continuous or step-wise addition of monomer(s) (and/or other ingredients) during polymerisation, and is often applied in copolymerisations to minimize copolymer composition drift in case monomer reactivities are very different. If the polymerisation process for the block copolymer is to be carried out as a semi-batch process, the reaction is typically carried out as follows: the reactor is charged with a polymerisation medium, typically an organic solvent, the control agent, and optionally (part of) the initiator. Into a separate vessel are placed the monomer(s) and optionally polymerisation medium and initiator. For safety reasons the initiator can also be added via another separate vessel. The polymerisation medium in the reactor is heated and stirred while the monomer(s) and initiator are step-wise or gradually introduced. The rate of monomer and/or initiator addition is determined largely by the quantity of solution and/or the rate of polymerisation. When the additions are completed, heating may be continued for an additional period of time with or without additional initiator to reduce unreacted monomer levels.

Furthermore after preparation of a first block, the prepared block can be purified from residual monomers and subsequently used for the polymerisation of a second monomer composition as a second block, or the second monomer composition can be polymerised directly after the preparation of first block is completed. In this case at least 80 wt %, preferably at least 90 wt %, most preferred at least 95 wt % of the first block monomer composition is reacted before the second monomer composition is reacted. The second block can contain up to 20 wt % (preferably 10 wt % or less) of the first monomer composition.

A free-radical polymerisation of ethylenically unsaturated monomers to make the block copolymer and or the polymer will require the use of a source of free radicals (i.e. an initiator) to initiate the polymerisation. Suitable free-radical-yielding initiators include inorganic peroxides such as K, Na or ammonium persulfate, hydrogen peroxide, or percarbonates; organic peroxides, such as acyl peroxides including for example benzoyl peroxide, alkyl hydroperoxides such as t-butyl hydroperoxide and cumene hydroperoxide; dialkyl peroxides such as di-t-butyl peroxide; peroxy esters such as t-butyl perbenzoate; mixtures may also be used. The peroxy compounds are in some cases advantageously used in combination with suitable reducing agents (redox systems) such as iso-ascorbic acid. Metal compounds such as Fe.EDTA (ethylene diamine tetracetic acid) may also be usefully employed as part of the redox initiator system. Azo functional initiators such as 2,2'-azobis(isobutyro nitrile) (AIBN), 2,2'-azobis(2-methyl-butyronitrile) (AMBN) and 4,4'-azobis(4-cyano valeric acid) may also be used. The amount of initiator or initiator system to use is conventional. For the preparation of the block copolymer preferably the molar amount of initiator does not exceed the molar amount of control agent that is applied. A further amount of initiator may optionally be added at the end of the polymerisation process to assist the removal of any residual ethylenically unsaturated monomers.

A chain transfer agent may be added to control the molecular weight of the polymer. Suitable chain transfer agents include mercaptans such as n-dodecyl mercaptan, n-octylmercaptan, t-dodecylmercaptan, mercaptoethanol, iso-octyl thioglycolate, $C_{2-8}$ mercapto carboxylic acids and esters thereof such as 3-mercaptopropionic acid and 2-mercaptopropionic acid; and halogenated hydrocarbons such as carbon tetrabromide and bromotrichloromethane. Preferably no chain transfer agent is added during the preparation of the block copolymer.

Surfactants can be utilised in order to assist in the dispersion of the block copolymer and or polymer and or in the emulsification of the monomers in water (even if self-dispersible). Suitable surfactants include but are not limited to conventional anionic, cationic and/or non-ionic surfactants and mixtures thereof such as Na, K and $NH_4$ salts of dialkylsulfosuccinates, Na, K and $NH_4$ salts of alkyl sulphonic acids, Na, K and $NH_4$ alkyl sulphates, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups or carboxylic acid groups. Cationic surfactants include alkyl or (alk)aryl groups linked to quaternary ammonium salt groups. Non-ionic surfactants include polyglycol ether compounds and preferably polyethylene oxide compounds as disclosed in "Nonionic surfactants—Physical chemistry" edited by M. J. Schick, M. Decker 1987.

The crosslinking may be introduced by the use of a self-crosslinking monomer or the composition comprising the crosslinkable block copolymer-polymer obtained by the process of the invention is combined with a separate crosslinking agent. This may provide either a self-crosslinking system (with a long pot life, triggered by for instance a change in temperature or pH or the evaporation of one of the ingredients in the overall system, like a solvent or water), or a two pack system.

A separate crosslinking agent is preferably selected from the group consisting of polyhydrazides (including dihydrazides such as adipic acid dihydrazide), polyisocyanates, carbodiimides, polyaziridines, epoxies, melamine resins and mixtures thereof. Usually the polyisocyanates are added shortly before application.

Preferably the solids content of the water borne composition comprising the crosslinkable block copolymer-polymer is ≥20 wt %, more preferably ≥30 wt % and most preferably ≤65 wt %.

If the crosslinkable block copolymer-polymer is used in an aqueous composition or in an adhesive composition the average calculated Tg of the crosslinkable block copolymer-polymer before crosslinking is preferably ≤55° C.

Furthermore the block copolymer-polymer obtained by the process of the invention is particularly suitable for use in coating applications in which it may provide a key part of coating compositions or formulations. The crosslinkable block copolymer-polymer obtained by the process of the invention provides a route towards a more efficient use of crosslinking functional monomers and/or reduction of the amount of such costly monomers without compromising the desired application properties. The crosslinkable block copolymer-polymer composition may provide excellent application properties in terms of for example mechanical properties such as hardness, scratch resistance, (outdoor) durability, and resistances against solvents or stains, which makes the composition particularly suited for waterborne high performance coatings.

Alternatively the block copolymer-polymer obtained by the process of the invention may be used in compositions suitable for applications where property changes like hardness, permeability and flow at a defined temperature can be beneficial i.e. adhesives, coatings, films, cosmetics, paints, inks. Such coating compositions can be pigmented or unpigmented.

In an embodiment of the invention there is provided a use to coat a substrate with the waterborne crosslinkable block copolymer-polymer of the invention where the substrate is selected from the group consisting of wood, board, metals, stone, concrete, glass, cloth, leather, paper, carton, plastics, foam, fibrous materials (including hair and textiles) and the like.

Compositions of the invention may be applied to a suitable substrate by any conventional method including brushing, dipping, flow coating, spraying, flexo printing, gravure printing any other method conventionally used in graphic arts or similar end uses. The aqueous carrier medium is removed by natural drying or accelerated drying (by applying heat) to form a coating.

Preferably a coating prepared using the crosslinkable block copolymer-polymer composition has good resistance to chemicals (stain resistances) and to blocking when dried. Blocking is the well-known phenomenon of coated substrates which are in contact tending to unacceptably adhere to each other, such as windows and doors in their respective frames, particularly when under pressure, as for example in stacked panels.

The aqueous composition may also contain conventional ingredients, some of which have been mentioned above; examples include pigments, dyes, emulsifiers, surfactants, plasticisers, thickeners, heat stabilisers, levelling agents, anti-cratering agents, fillers, sedimentation inhibitors, UV absorbers, antioxidants, drier salts, organic co-solvents, wetting agents and the like introduced at any stage of the production process or subsequently. It is possible to include an amount of antimony oxide in the emulsion to enhance the fire retardant properties.

Suitable organic co-solvents which may be added during the process or after the process during formulation steps are well known in the art and include for example xylene, toluene, methyl ethyl ketone, acetone, ethanol, isopropanol, ethyl acetate, butyl acetate, diethylene glycol, ethylene diglycol, butyl glycol, butyl diglycol, 1-methyl-2-pyrrolidinone and/or dipropylene glycol monomethyl ether.

Preferably the water borne composition comprises from 0 to 50 wt %, more preferably from 0 to 40 wt % and most preferably from 0 to 35 wt % of organic co-solvent by weight of the block copolymer-polymer.

If desired the block copolymer-polymer obtained by the process of the invention can be used in combination with other polymer compositions which are not according to the invention.

In another embodiment there is provided an aqueous emulsion according to the invention additionally comprising a polymer Q, wherein the solids content of the block copolymer-polymer P together is ≥1 wt % and ≤35 wt % based on total solids content of block copolymer-polymer P and polymer Q together. Preferably polymer Q is an acrylic, urethane, urethane-acrylic, alkyd, alkyd-acrylic or another type of polymer.

In a preferred embodiment there is provided a blend of an aqueous polymer Q dispersion comprising an acrylic, urethane, urethane-acrylic, alkyd, alkyd-acrylic or another type of polymer Q with the aqueous emulsion of the invention. The advantage of such blending is that the overall performance properties of the aqueous polymer dispersion (coating) are retained, and additionally the aqueous emulsion of the invention provides the coating with improved resistance to blocking and or improved resistance to chemicals and or improved hardness when applied onto a substrate.

Preferably the solids content of the aqueous emulsion prepared by the process of the invention added to the aqueous polymer Q dispersion amounts ≤35 wt % on total solids content of the blend and more preferably ≤25 wt %. Preferably the solids content of the aqueous emulsion prepared by the process of the invention added to the aqueous polymer Q dispersion amounts ≥1 wt % on total solids content of the blend and more preferably ≥5 wt %.

Preferably the polymer Q dispersion that is added to the aqueous emulsion prepared by the process of the invention is an aqueous acrylic polymer dispersion.

Preferably the particle size of the polymer Q dispersion that is blended with the aqueous emulsion prepared by the process of the invention of the invention is in the range of from 50 to 400 nm, preferably ≥100 nm. Preferably the particle size of the aqueous emulsion according to the invention is ≤100 nm.

Many other variations embodiments of the invention will be apparent to those skilled in the art and such variations are contemplated within the broad scope of the present invention.

Further aspects of the invention and preferred features thereof are given in the claims herein.

EXAMPLES

The present invention will now be described in detail with reference to the following non limiting examples which are by way of illustration only. Unless otherwise specified, all parts, percentages and ratios are on a weight basis.

Test Descriptions

Gloss

The gloss level of the dried film was determined using a Byk Gardner micro-TRI-gloss device set at an angle of 20 degrees or 60 degrees.

Surface Hardness

König hardness was determined following DIN 53157 NEN5319 using Erichsen hardness measuring equipment. The values are given in seconds and the higher the value is the harder the coating is.

Molecular Weight Determinations

Gel permeation chromatography (GPC) analyses for the determination of molecular weights were performed on an Alliance Waters 2690 GPC with two consecutive PL-gel columns (type Mixed-C, l/d=300/7.5 mm) using tetrahydrofuran (THF) as the eluent at 1 cm$^3$/min and using an Alliance Waters 2410 refractive index detector. A set of polystyrene standards (analysed according to DIN 55672) was used to calibrate the GPC.

Samples corresponding to about 16 mg of solid material were dissolved in 8 mL of THF, and the mixtures were stirred until the samples dissolved. The samples were left undisturbed for at least 24 hours for complete "uncoiling" and subsequently were filtered (Gelman Acrodisc 13 to 25 mm ø CR PTFE; 0.45 μm) and placed on the auto-sampling unit of the GPC.

Block Resistance

The degree of blocking of a coating lacquer against the same coating lacquer was assessed with a Koehler Block tester (ex Instrument Company Inc.). The blocking resistance of dried films was measured after 16 hours in an oven at 50° C. under a pressure of 1 kg/cm$^2$.

Coated Leneta test cards were cut into pieces of 30×100 mm and placed cross-wise so that lacquer against lacquer was tested. The degree of blocking was determined on the ease of pulling the two test specimens apart and assessing the coating for any damage. (5 very good: entirely separated and undamaged. 4 fair: some sticking hardly any damage. 3 mediocre. 2 poor. 1 very poor: stuck together; once pulled apart, they are both completely damaged.)

Stain Resistance Test

A small piece of cotton wool was placed on the dried film, which was then soaked with the test liquid, such as demineralised water, alcohol (48% in water), coffee or red wine. The soaked pieces of cotton wool were then covered by a petri-dish to prevent drying out. After a fixed period of time (16 hours, 5 hours or 1 hour) the pieces of cotton wool and residual liquid were removed and the degree of coating damage was determined as follows: 5=very good: no visible damage or degradation/discoloration; 4=only slight visible damage or haze/blooming; 3=clear haze/blooming or damage; 2=coating partially dissolved; 1=coating is almost completely dissolved; 0=very poor: coating is completely dissolved. Stain resistance tests were performed on coated Leneta test cards. The wet heat resistance of the coating was also tested by performing a "hot pan" test. In this particular test a water droplet was placed on the coating and then a glass beaker filled with hot water of 85° C. was placed on top of this droplet and left to stand for 1 hour, after which the beaker and droplet were removed and the degree of coating damage was assessed as described above.

In the examples, the following abbreviations and terms are specified:
AA=acrylic acid
ADH=adipic acid dihydrazide
APS=ammonium persulfate
BA=butyl acrylate
DAAM=diacetone acrylamide
DP=degree of polymerization
HEA=2-hydroxyethyl acrylate
MEK=methyl ethyl ketone
MMA=methyl methacrylate
xanthate 1=O-ethyl-S-(1-methoxycarbonyl)ethyl dithiocarbonate (Rhodixan A1, provided by Rhodia Chimie)
SLS=sodium lauryl sulfate
Sty=styrene Example 1

Block Copolymer 1

Synthesis of a $[A]_x[B]_y$ Diblock Copolymer where Block [A] is Based on AA and x=20 and Block [B] is Based on BA and DAAM with y=40 (DP BA=30; DP DAAM=10)

Block [A]: 150 gram of ethanol and 25 gram (120 mmol) of xanthate 1 were added to a 1 L three-necked glass flask equipped with condenser cooler, temperature measuring probe and mechanical stirring device. The reaction mixture was degassed by purging with nitrogen at room temperature for 15 minutes while stirring. The temperature was raised to 70° C. and 10 wt % of a monomer feed mixture of 175 gram (2.4 mol) of AA and 320 gram of ethanol was added to the reaction mixture. Then 2.0 gram (approximately 5 mmol) of 4,4'-azobis(4-cyanovaleric acid) (Aldrich, 75+%) was added.

After 10 minutes at 70° C. the gradual addition was started of the remaining 90 wt % of the AA/ethanol mixture. The addition lasted 3 hours under a weak nitrogen stream and at a controlled temperature of 70° C., after which the mixture was kept for 4 hours at 70° C. For further reduction of free monomer an additional amount of 1.0 gram of 4,4'-azobis(4-cyanovaleric acid) was added and the mixture was kept for another 4 hours at 75° C. The reaction mixture was then cooled to 20° C. and a sample was withdrawn for further analysis. The conversion of AA as determined with gas chromatography was found to be 97% and the solids level was experimentally determined at 30%. GPC analyses of the final product resulted in the following values: Mn=1315 g/mol, PDI (=Mw/Mn)=1.22.

Block [B]: 100 gram of the block [A] reaction mixture, corresponding to approximately 18 mmol of precursor block [A] based on a solids level of 30% and a theoretical molecular weight of 1650 g/mol, was added to a 500 mL three-necked glass flask equipped with condenser cooler, temperature measuring probe and mechanical stirring device. The reaction mixture was degassed by purging with nitrogen at room temperature for 15 minutes while stirring. The temperature was raised to 70° C. and 10 wt % of a monomer feed mixture of 70.0 gram (546 mmol) of BA, 30.7 gram (181 mmol) of DAAM, and 62 gram of ethanol was added to the reaction mixture.

Then a mixture of 0.7 gram (approximately 2 mmol) of 4,4'-azobis(4-cyanovaleric acid) (Aldrich, 75+%) and 10 gram of ethanol was added to the reaction mixture. After 10 minutes at 70° C. the gradual addition was started of the remaining 90 wt % of the BA/DAAM/ethanol mixture. The addition lasted 4 hours under a weak nitrogen stream and at a controlled temperature of 70° C., after which the mixture was kept for 4 hours at 70° C. The reaction mixture was then cooled to 20° C. and a sample was withdrawn for further analysis. The conversion of BA and DAAM as determined with gas chromatography was found to be 98.7% and 97.4%, respectively. The final solids level was experimentally determined at 57% and adjusted to 50% by addition of ethanol. GPC analysis of the final product resulted in the following values: Mn=4536 g/mol, PDI (=Mw/Mn)=1.61.

Block Copolymer 2

Synthesis of a $[A]_x[B]_y$ Diblock Copolymer where Block [A] is Based on AA and x=20 and Block [B] is Based on BA and y=40

Block [B]: 180 gram of the block [A] reaction mixture prepared for block copolymer 1 was added to a 1 L three-necked glass flask equipped with stirrer, condenser cooler, temperature measuring probe. The reaction mixture was purged with nitrogen at room temperature for 15 minutes while stirring. The temperature was raised to 70° C. and 10 wt % of a monomer feed mixture of 168.0 gram (1.3 mol) of BA and 93 gram of ethanol was added to the reaction mixture.

Then a mixture of 1.8 gram (approximately 5 mmol) of 4,4'-azobis(4-cyanovaleric acid) (Aldrich, 75+%) and 7 gram of ethanol was added to the reaction mixture. After 10 minutes at 70° C. the gradual addition was started of the remaining 90 wt % of the BA/ethanol mixture. The addition lasted 5 hours under a weak nitrogen stream and at a controlled temperature of 70° C., after which the mixture was kept for an additional 5 hours at 70° C. The reaction mixture was then cooled to 20° C. and a sample was withdrawn for further analysis. The conversion of BA as determined with gas chromatography was found to be 96.5%. The final solids level was 50%. GPC analysis of the final product resulted in the following values: Mn=4465 g/mol, PDI (=Mw/Mn)=1.51.

Preparation of an Aqueous Dispersion of Block Copolymer 1

190 gram of block copolymer 1 was slowly added to a mixture of 380 gram of demineralised water and 12 gram of triethylamine at 20° C. whilst stirring. A stable aqueous dispersion was obtained of which the pH was further adjusted to 8 by addition of 14 gram of triethylamine. After removal of residual ethanol from the dispersion under reduced pressure (rotary evaporation) and extra addition of demineralised water the final solids was experimentally determined at 20.0%.

Preparation of an Aqueous Dispersion of Block Copolymer 2

200 gram of block copolymer 2 was slowly added to a mixture of 250 gram of demineralised water and 17.5 gram of triethylamine at 20° C. whilst stirring. A stable aqueous dispersion was obtained of which the pH was further adjusted to 8 by addition of 7 gram of triethylamine. After removal of residual ethanol from the dispersion under reduced pressure (rotary evaporation) and extra addition of demineralised water the final solids was experimentally determined at 23.8%.

Example 1

Synthesis of a Block Copolymer-Polymer Based on Block Copolymer 1

128 gram of demineralised water and 51.8 gram of the aqueous dispersion of block copolymer 1 prepared above (20% in water) were added to a 1 L three-necked glass flask equipped with stirrer, condenser cooler and temperature measuring probe. The reaction mixture was heated while stirring to 85° C. under nitrogen atmosphere. Then 5 wt % of a pre-emulsified monomer mixture consisting of in total 81.2 gram demineralized water, 3.5 gram SLS (30 wt % in water), 111.3 gram MMA and 95.7 gram BA was added. After 10 minutes at 85° C. an initiator mixture of 0.2 gram APS and 3.3 gram demineralised water, set at pH=8 with triethylamine, was added. After 15 minutes an initiator feed mixture of 0.4 gram APS and 43 gram water and the remaining 95 wt % of the pre-emulsified monomer feed were gradually added as parallel feeds to the reaction mixture over a time period of 3 hours. During the reaction the pH of the reaction mixture was kept above 7.0. At the end of the monomer and initiator feed approximately 80 grams of demineralised water was added and the reaction mixture was then kept for 1 hour at 85° C. A post reaction with tert-butyl hydroperoxide and isoascorbic acid was performed to react any residual monomer. The resultant emulsion was then cooled to room temperature.

Examples 2 to 3 and Comparative Example 1

Examples 2 and 3, and Comparative Example 1 were prepared according a similar recipe and procedure as applied for Example 1, where only the type and amount of block copolymer (on total polymer weight) or the Tg of the polymer (MMA/BA) was varied.

Comparative Example 2

Synthesis of an MMA/BA (TQ 10° C.) Latex 238.8 gram of demineralised water and 5.1 gram of sodium lauryl sulphate (30 wt % in water) were added to a 1 L three-necked glass flask equipped with stirrer, condenser cooler and temperature measuring probe. The reaction mixture was heated while stirring to 65° C. under nitrogen atmosphere. Then 5% was added of a pre-emulsified monomer mixture consisting of in total 131.9 gram demineralized water, 5.1 gram SLS (30 wt % in water), 0.6 gram isooctyl thioglycolate, 163.7 gram MMA, 140.8 gram BA, 4.4 gram AA, and 5.1 gram DAAM. The reaction mixture was further heated to 75° C. and then a mixture of 0.2 gram APS and 3.3 gram demineralised water was added. The reaction mixture was heated to 85° C. and kept at this temperature for 15 minutes. An initiator feed mixture of 0.64 gram APS and 63.3 gram demineralised water and the remaining 95% of the pre-emulsified monomer feed were then gradually added as parallel feeds to the reaction mixture over a time period of 3 hours. The reaction mixture was then kept for 30 minutes at 85° C. A post reaction with tert-butyl hydroperoxide and isoascorbic acid was performed to react any residual monomer. The resultant emulsion was then cooled to room temperature. The pH of the latex was adjusted from 2.2 to 8.0 by addition of ammonia.

The composition of Examples and Comparative examples are summarized in Table 1 below. The properties of the final prepared acrylic dispersions are given in Table 2. Final free monomer levels were all below 500 ppm. All latexes were processed with little or no fouling and/or sediment formation.

TABLE 1

| Experiment | Block copolymer (DP) | Polymer | Block copolymer wt % on total polymer |
|---|---|---|---|
| Example 1 | 1 = AA − BA/DAAM (20-30/10) | MMA/BA; Tg 10° C. | 5% |
| Example 2 | 1 = AA − BA/DAAM (20-30/10) | MMA/BA; Tg 10° C. | 7.5% |
| Example 3 | 1 = AA − BA/DAAM (20-30/10) | MMA/BA; Tg 30° C. | 7.5% |
| Comparative 1 | 2 = AA − BA (20-40) | MMA/BA; Tg 10° C. | 7.5% |
| Comparative 2 | None | MMA/BA; Tg 10° C. | — |
| Comparative 3 | None | MMA/BA; Tg 30° C. | — |

TABLE 2

| Experiment | Solids[1] [%] | pH | Final particle size (DLS) [nm] | Mn [kg/mol] | Mw [kg/mol] |
|---|---|---|---|---|---|
| Example 1 | 36.5 | 7.8 | 72 | 25.3 | 197 |
| Example 2 | 33.5 | 7.7 | 60 | 26.5 | 152 |
| Example 3 | 36.4 | 7.8 | 65 | 27.6 | 191 |
| Comparative 1 | 34.4 | 8.1 | 60 | 28.6 | 146 |
| Comparative 2 | 39.8 | 8.0 | 95 | 54.4 | 313 |
| Comparative 3 | 39.0 | 7.8 | 94 | 33.8 | 236 |

[1] gravimetrically determined

Prior to testing the acrylic dispersions were all formulated with 7% (Tg 10° C. systems) or 8% (Tg 30° C. systems) on total dispersion of premix 1, and 2% on total dispersion of premix 2, where premix 1 is a 75/25 mixture of butyl glycol/butyl diglycol (80% in water), and premix 2 is a 50/50 mixture of Fluowet SB/Byk 346 (2% in water). The pH of premix 1 and 2 was adjusted to about 8 by ammonia before addition. To half of the formulated amount ADH was added at 0.7 equivalents to the total of reactive DAAM groups in the polymer in order to determine the difference in film properties before and after crosslinking.

Films of the formulated dispersions with and without ADH were cast onto a Leneta test chard (120 micron wet) and on glass (80 micron wet), and dried for a 2 to 4 hours at room temperature. The films were then dried in an oven at 50° C. for a period of 64 hours to make sure that all water and residual solvent was removed from the film. The obtained dry films were then examined for gloss level, König hardness, and block resistance. Test results are given in Table 3 below.

TABLE 3

| Experiment | Cross-linker | Gloss 20°/60° | König hardness (sec) | Block resistance (0-5; 0 = poor) |
|---|---|---|---|---|
| Example 1 | none | 65/85 | 40 | 0 |
| | ADH | 68/87 | 51 | 4 |
| Example 2 | none | 66/84 | 25 | 2 |
| | ADH | 66/87 | 48 | 4 |
| Example 3 | none | 61/84 | 70 | 3 |
| | ADH | 64/87 | 94 | 5 |
| Comparative 1 | none | 63/85 | 36 | 3 |
| | ADH [1] | 41/82 | 34 | 3 |
| Comparative 2 | None | 72/86 | 51 | 0 |
| | ADH | 72/87 | 46 | 0 |
| Comparative 3 | None | 69/87 | 79 | 0 |
| | ADH | 71/87 | 96 | 0 |

[1] same level of ADH applied as for Example 2.

The data shows that coatings prepared from Examples 1 to 3 of the invention have improved block resistance and hardness compared to those obtained from Comparative Examples 1 to 3.

Examples 4 and 5

Crosslinked with Isocyanate

An overview of Example 4 and 5 and the Comparative Example 4 is given in Table 4.

TABLE 4

| Experiment | Block copolymer (DP) | Polymer | Block copolymer wt % on total polymer |
|---|---|---|---|
| Example 4 | 3 = AA − BA/HEA (20-60/40) | Sty/MMA/BA | 20% |
| Example 5 | 4 = AA/HEA − BA/HEA (15/5-65/35) | Sty/MMA/BA | 20% |
| Comparative 4 | None | Sty/MMA/BA/HEA/AA | n.a. |

Block Copolymer 3

Synthesis of a $[A]_x$-$[B]_y$ Diblock Copolymer where Block A is Based on AA and x=20 and Block [B] is Based on BA and HEA with y=100 (DP BA=60; DP HEA=40)

Block [A]:; Block [B]:

The block [A] reaction mixture was prepared according a similar procedure as described for Block copolymer 1 (data for block [A] from GPC analysis: Mn=2190 g/mol, PDI (=Mw/Mn)=1.25). For the preparation of block [B] of Block copolymer 3, 200 gram of the block [A] reaction mixture, corresponding to approximately 46 mmol of precursor block [A] based on a solids level of 38.1% and a theoretical molecular weight of 1650 g/mol, and 200.0 gram of MEK was added to a 2 L three-necked glass flask equipped with stirrer, condenser cooler, temperature measuring probe. The reaction mixture was purged with nitrogen at room temperature for 15 minutes while stirring. The temperature was raised to 75° C. and 10 wt % of a monomer feed mixture of 355.0 gram (2.77 mol) of BA, 214.5 gram (1.85 mol) of HEA, and 307.0 gram of MEK was added to the reaction mixture. Then a mixture of 3.0 gram (approximately 8 mmol) of 4,4'-azobis(4-cyanovaleric acid) (Aldrich, 75+%) and 10 gram of ethanol was added to the reaction mixture. After 15 minutes at 75° C. the gradual addition was started of the remaining 90 wt % of the BA/HEA/MEK mixture. The addition lasted 4 hours under a weak nitrogen stream and at a controlled temperature of 75° C. Then a mixture of 1.0 gram of 4,4'-azobis(4-cyanovaleric acid) and 10 gram of ethanol was added to the reaction mixture and the reaction mixture was kept for 4 hours at 75° C. The reaction mixture was then cooled to 20° C. and a sample was withdrawn for further analysis. The conversion of BA and HEA as determined with gas chromatography were found to be 97.9% and 98.3% respectively. The final solids level was experimentally determined at 50.8%. GPC analysis of the final product (using THF as solvent and calibration on polystyrene standards) resulted in the following value: Mn=5770 g/mol, Mw=14,350, PDI=2.49.

Block Copolymer 4

Synthesis of a $[A]_x$-$[B]_y$ Diblock Copolymer where Block [A] is Based on AA and HEA with x=20 (DP AA=15; DP HEA=5), and Block [B] is Based on BA and HEA with y=100 (DP BA=65; DP HEA=35)

Block [A]:

425.0 gram of MEK and 60.0 gram (0.290 mol) of xanthate 1 were added to a 2 L three-necked glass flask equipped with condenser cooler, temperature measuring probe and mechanical stirring device. The reaction mixture was degassed by purging with nitrogen at room temperature for 15 minutes while stirring. The temperature was raised to 70° C. and 10 wt % of a monomer feed mixture of 314.0 gram (4.36 mol) of AA, 170.0 gram (1.46 mol) of HEA and 355.0 gram of MEK was added to the reaction mixture. Then a mixture of 5.0 gram (approximately 13 mmol) of 4,4'-azobis(4-cyanovaleric acid) (Aldrich, 75+%) and 40 gram of ethanol was added. After 15 minutes at 70° C. the gradual addition was started of the remaining 90 wt % of the AA/HEA/MEK mixture. The addition lasted 5 hours under a weak nitrogen stream and at a controlled temperature of 70° C., after which 85 gram of ethanol was added and the mixture was kept for 4 hours at 70° C. The reaction mixture was then cooled to 20° C. and a sample was withdrawn for further analysis. The solids level was experimentally determined at 39.5%. GPC analysis of the final product resulted in the following values: Mn=1750 g/mol, PDI (=Mw/Mn)=1.37.

Block [B]:

The preparation of block [B] of Block copolymer 4 was performed using the same recipe and procedure as applied for Block copolymer 3, but now the reaction mixture consisted of 220.0 gram of the block [A] reaction mixture, corresponding to approximately 46.5 mmol of the AA/HEA precursor block [A] based on a solids level of 39.5% and a theoretical molecular weight of 1870 g/mol, and 180.0 gram of MEK, and the monomer reaction mixture for block [B] consisted of 378.5 gram (3.02 mol) of BA, 189.0 gram (1.63 mol) of HEA and 335.0 gram of MEK. Analysis of the final product resulted in 97.4% conversion of BA and 98.0% conversion of HEA as determined with gas chromatography, and a final solids level of 50.0%. GPC analysis of the final product (using THF as solvent and calibration on polystyrene standards) resulted in the following values: Mn=7039 g/mol, Mw=16,535, PDI (=Mw/Mn)=2.35.

Preparation of an Aqueous Dispersion of Block Copolymer 3 and 4

Block copolymer 3: 24.4 gram of triethylamine (equal molar ratio to the number of carboxylic acid groups) was added to 420.0 gram of Block copolymer 3 whilst stirring, followed by the addition of 615.1 gram of demineralised water. A stable aqueous dispersion was obtained of which the pH was further adjusted to 8 by triethylamine. After removal of residual MEK/ethanol from the dispersion under reduced pressure the final solids level was adjusted with demineralised water to 25.0%. The particle size of the dispersion as determined with light scattering was 44 nm.

Block copolymer 4: 20.9 gram of triethylamine (equal molar ratio to the number of carboxylic acid groups) was added to 420.0 gram of Block copolymer 4 whilst stirring, followed by the addition of 760.6 gram of demineralised water. A stable aqueous dispersion was obtained of which the pH was further adjusted to 8 by triethylamine. After removal of residual MEK/ethanol from the dispersion under reduced pressure the pH was measured the final solids level was adjusted with demineralised water to 20.0%. The particle size of the dispersion as determined with light scattering was 53 nm.

Example 4

Synthesis of a Block Copolymer-Polymer Based on Block Copolymer 3

129 gram of demineralised water and 211.5 gram of the aqueous dispersion of Block copolymer 3 prepared above (25% in water) were added to a 1 L three-necked glass flask equipped with stirrer, condenser cooler and temperature measuring probe. The reaction mixture was heated while stirring to 80° C. under nitrogen atmosphere. Then a mixture of 18.5 gram Sty, 24.8 gram MMA and 9.5 gram BA was added. After 20 minutes at 70° C. wt % an initiator mixture of 0.26 gram APS and 5.0 gram demineralised water, set at pH=8 with triethylamine, was added. The reaction mixture was then heated for 20 minutes at 85° C. Then the gradual addition was started of an initiator feed mixture of 0.53 gram APS and 52.3 gram of demineralised water, set at pH=8 with triethylamine, and of a pre-emulsified monomer feed mixture consisting of in total 87 gram demineralized water, 4.4 gram of Disponil FES 993 (30 wt % in water, Cognis), 74.0 gram Sty, 99.4 gram MMA and 38.0 gram BA. Both mixtures were added as parallel feeds to the reaction mixture over a time period of 1.5 hours and at a controlled reaction temperature of 85° C. During the reaction the pH of the reaction mixture was kept above 7.0 and additional amount of water (approximately 115 gram) was added to maintain a low viscosity. At the end of the monomer and initiator feed the reaction mixture was kept for 30 minutes at 85° C. A post reaction with tert-butyl hydroperoxide and isoascorbic acid was performed to react any residual monomer. The resultant emulsion was then cooled to room temperature. GPC analysis of the final product (using THF as solvent and calibration on polystyrene standards) resulted in the following values: Mn=40,125 g/mol, Mw=148,300, PDI (=Mw/Mn)=3.70.

Example 5

Synthesis of a Block Copolymer-Polymer Based on Block Copolymer 4

Example 5 was prepared according a similar recipe and procedure as applied for Example 4, but now the aqueous dispersion of Block copolymer 4 was applied.

Comparative 4: Synthesis of an Sty/MMA/BA/HEA/AA Latex:

This Comparative example illustrates the synthesis of a conventional emulsion polymer with the same overall monomer composition as Examples 4 and 5. 645.7 gram of demineralised water and 18.5 gram of Disponil FES 993 (30 wt % in water, Cognis) were added to a 2 L three-necked glass flask equipped with stirrer, condenser cooler and temperature measuring probe. The reaction mixture was heated while stirring to 80° C. under nitrogen atmosphere. Then 10 wt % was added of a pre-emulsified monomer mixture consisting of in total 285 gram demineralized water, 27.8 gram of Disponil FES 993 (30 wt % in water), 7.0 gram n-dodecylmercaptan, 203.7 gram Sty, 273.3 gram MMA, 168.3 gram BA, 38.2 gram HEA and 11.8 gram AA. Then at 75° C. a mixture of 0.70 gram APS and 13.2 gram demineralised water was added. After 5 minutes the reaction mixture was heated to 85° C. and kept at this temperature for 15 minutes. An initiator feed mixture of 1.39 gram APS and 68.1 gram demineralised water and the remaining 90 wt % of the pre-emulsified monomer feed were then gradually added as parallel feeds to the reaction mixture over a time period of 1.5 hours. The reaction mixture was then kept for 30 minutes at 85° C. A post reaction with tert-butyl hydroperoxide and isoascorbic acid was performed to react any residual monomer. The resultant emulsion was then cooled to room temperature. The pH of the latex was adjusted from 2.3 to 7.5 by addition of ammonia.

The properties of the final prepared acrylic dispersions are given in Table 5. Final free monomer levels were all below 500 ppm. All lattices were processed with little or no fouling and/or sediment formation.

TABLE 5

| Experiment | Solids[1] [%] | pH [—] | Viscosity (Brookfield) [mPa · s] | Final particle size (DLS) [nm] | % OH [wt % on total binder solids] |
|---|---|---|---|---|---|
| Example 4 | 34.5 | 7.5 | 249 | 62 | 0.8 |
| Example 5 | 31.9 | 7.5 | 265 | 88 | 0.8 |

TABLE 5-continued

| Experiment | Solids[1] [%] | pH [—] | Viscosity (Brookfield) [mPa · s] | Final particle size (DLS) [nm] | % OH [wt % on total binder solids] |
|---|---|---|---|---|---|
| Comparative 4 | 39.5 | 7.5 | 34 | 94 | 0.8 |

[1]gravimetrically determined

Prior to testing Examples 4 and 5 and Comparative example 4 were all formulated into a clear-coat 1-component (1C) system, meaning without added crosslinker, and in a clear-coat two-component (2C) system with added polyisocyanate crosslinker (Rhodocoat D-401, Rhodia). The formulation recipes are given in Table 2.

The preparation of the formulations was as follows. The acrylic dispersions (Examples 4 and 5 and Comparative example 4) were formulated with Premix A (consisting of 5.0 parts butyl diglycol, 2.0 parts butyl glycol, 2.0 parts Dowanol DPM, 2.0 parts demineralised water and 0.50 parts Byk 346, all set at pH 7.5 with ammonia). Then to the obtained formulations an additional amount of coalescent (dipropylene glycol monomethyl ether (Dowanol DPM) and ethylene diglycol (EDG)) was added for further optimisation of the film formation. To a part of the obtained 1C formulations was then added a polyisocyanate resin (Rhodocoat D-401, 85% in BuAc, NCO %=16) to obtain the 2C formulations. An large excess of polyisocyanate resin (NCO/OH molar ratio of 5/1) was used to demonstrate the effect of crosslinking on the film properties.

It is however preferred that the NCO/OH molar ratio ranges from 0.8 to 1.5, more preferred from 1.0 to 1.3.

TABLE 6

| | Formulation Example 1 | Formulation Example 2 | Formulation Comparative Example 1 |
|---|---|---|---|
| 1C formulation | | | |
| Example 4 | 83.0 | — | — |
| Example 5 | — | 83.0 | — |
| Comparative example 4 | — | — | 83.0 |
| Premix A | 17.0 | 17.0 | 17.0 |
| Dowanol DPM | 4.0 | 4.0 | 2.0 |
| EDG | 3.0 | 2.0 | — |
| Total 1C formulation | 107 | 106 | 102 |
| 2C formulation | | | |
| 1C Formulation | 75.0 | 75.0 | 75.0 |
| Rhodocoat D-401 | 12.27 | 11.17 | 14.37 |

Films of the 1C or 2C formulated dispersions were cast onto a Leneta test chard (100 micron wet) and on glass (80 micron wet), and dried for 5 minutes at 20+/−2° C., then for 20 minutes at 60° C. The films were then dried in an oven at 50° C. for a period of 16 hours to make sure that all water and residual solvent was removed from the film. After this drying period the films were left for one night at 21° C. at 50% relative humidity. The obtained dry films were then examined for König hardness and stain resistances. Test results are given in Table 7.

TABLE 7

Results for 1-component (1C) and 2-component (2C formulations).

| | A | B | C | D | E | F |
|---|---|---|---|---|---|---|
| | Example 4 | | Example 5 | | Comparative example 4 | |
| Formulation | 1C | 2C | 1C | 2C | 1C | 2C |
| Pot life (time to gel) | n.a. | 2 hrs | n.a. | 2 hrs | n.a. | >3 hrs |
| Hardness (sec) | 77 | 169 | 119 | 165 | 146 | 147 |
| Stain resistances | | | | | | |
| Ethanol (48%) (16 hr) | 3 | 4-5 | 2-3 | 4-5 | 0-1 | 4 |
| Coffee (16 hr) | 5 | 5 | 2-3 | 5 | 4 | 5 |
| Demineralised water (16 hr) | 5 | 5 | 5 | 5 | 5 | 5 |
| Red wine (5 hr) | 5 | 5 | 5 | 5 | 3-4 | 5 |
| Ethanol (48%) (1 hr) | 4-5 | 5 | 3 | 5 | 0-1 | 4-5 |
| Coffee (1 hr) | 5 | 5 | 5 | 5 | 5 | 5 |
| Hot pan (1 hr) | 5 | 5 | 5 | 5 | 4 | 4 |

The test results given in Table 7 show that Example 4 and 5 have better chemical resistances than the Comparative example 4 in the formulations without added crosslinker (1C). Also in the two-component polyisocyanate formulations (2C) Example 4 and 5 give a much stronger increase in hardness than Comparative Example 4, which is an indication of more efficient crosslinking and network formation.

The invention claimed is:

1. A process for obtaining a water borne non-biologically active crosslinkable block copolymer-polymer composition comprising a crosslinkable block copolymer comprising at least blocks $[A]_x[B]_y$, a polymer P, and a separate crosslinking agent, wherein the block copolymer-polymer composition has an acid value ≤150 mg KOH per g of block copolymer-polymer, wherein the process comprises:
(a) subjecting at least one ethylenically unsaturated monomer by a controlled radical polymerization via a reversible addition-fragmentation chain transfer (RAFT) mechanism in solution in the presence of a control agent selected from the group consisting of dithioesters, thioethers-thiones, trithiocarbonates, dithiocarbamates, xanthates and mixtures thereof, and in the presence of a source of free radicals to obtain at least blocks [A] and [B], wherein a first block [A] is prepared followed by the polyemerisation of at least a second block [B] or wherein a first block [B] is prepared followed by the polymerization of at least a second block [A], thereby obtaining the block copolymer; wherein
the wt % of blocks [A][B] together is in the range of from 0.5 to 50% based on the weight of the blocks [A][B] and the polymer P; and wherein
block [A] comprises:
i) 0 to 50 mol % of ethylenically unsaturated monomer units bearing crosslinking functional groups, wherein the ethylenically unsaturated monomer units bearing crosslinking functional groups are selected from the group consisting of acetoacetoxyethyl methacrylate, diacetone acrylamide, and mixtures thereof;
ii) 50 to 100 mol % ethylenically unsaturated monomer units bearing water dispersing functional groups;
iii) 0 to 50 mol % of ethylenically unsaturated monomers units selected from C1 18 alkyl(meth)acrylate monomers and styrenic monomers;
iv) 0 to 35 mol % of ethylenically unsaturated monomers units different from those from i), ii) + iii);
where i), ii), iii) + iv) add up to 100%;
block [A] has a Hansch parameter <1.5; and
block [A] has an average degree of polymerisation x, where x is an integer from 3 to 80; and wherein
block [B] comprises:
i) 5 to 80 mol % of ethylenically unsaturated monomer units bearing crosslinking functional groups, wherein the ethylenically unsaturated monomer units bearing crosslinking functional groups are selected from the group consisting of acetoacetoxyethyl methacrylate, diacetone acrylamide and mixtures thereof;
ii) 0 to 20 mol % of ethylenically unsaturated monomer units bearing water dispersing functional groups;
iii) 20 to 95 mol % of ethylenically unsaturated monomers units selected from C1 18 alkyl(meth)acrylate monomers and styrenic monomers;
iv) 0 to 35 mol % of ethylenically unsaturated monomers units different from those from i), ii) + iii);
where i), ii), iii) + iv) add up to 100%;
block [B] has a Hansch parameter ≥1.5; and
block [B] has an average degree of polymerisation y, where y is an integer ≥10, where y>x;
(b) conducting an emulsion polymerization process in the presence of the block copolymer obtained according to step (a) to obtain the polymer P, wherein the polymer P comprises:
i) 0 to 5 wt % of ethylenically unsaturated monomer units bearing crosslinking functional groups;
ii) 0 to 5 wt % of ethylenically unsaturated monomer units bearing water dispersing functional groups;
iii) 80 to 100 wt % of ethylenically unsaturated monomers units selected from C1 18 alkyl(meth)acrylate monomers and styrenic monomers;
iv) 0 to 10 wt % of ethylenically unsaturated monomers units different from those from i), ii) + iii);
where i), ii), iii) + iv) add up to 100%, and
(c) combining the crosslinkable copolymer-polymer with a separate crosslinking agent to obtain the water-borne non-biologically active crosslinkable copolymer-polymer composition.

2. A process according to claim 1 where:
block [A] comprises:
(i) 0 to 20 mol % of ethylenically unsaturated monomer units bearing crosslinking functional groups, wherein the ethylenically unsaturated monomer units bearing crosslinking functional groups are selected from the group consisting of acetoacetoxyethyl methacrylate, diacetone acrylamide and hydroxyalkyl (meth)acrylates and mixtures thereof;
iii) 0 to 50 mol % of ethylenically unsaturated monomers units selected from C1 12alkyl (meth)acrylate monomers and styrenic monomers; and
iv) 0 to 20 mol %, of ethylenically unsaturated monomers units different from those from i), ii) + iii);
block [B] comprises:
iii) 20 to 95 mol % of ethylenically unsaturated monomers units selected from C1 12 alkyl(meth)acrylate monomers and styrenic monomers; and
iv) 0 to 20 mol % of ethylenically unsaturated monomers units different from those from i), ii) + iii); and the polymer P comprises:
  iii) 80 to 100 wt % of ethylenically unsaturated monomers units selected C1 12alkyl(meth)acrylate monomers and styrenic monomers.

3. A process according to claim 1, where the number average molecular weight of the block copolymer is in the range of from 1,000 to 50,000 g/mol.

4. A process according to claim 1, where the weight average molecular weight of the polymer P is >50,000 g/mol.

5. A process according to claim 1, any one of the wherein polymer P is more hydrophobic than block [A].

6. A process according to claim 1, where at least 20 wt % of polymer P is covalently bonded to the block copolymer.

7. A polymeric composition obtained by the process claimed in claim 1.

8. A water borne composition comprising the block copolymer-polymer composition of claim 7.

9. An ink, paint or adhesive comprising the block copolymer-polymer or a polymeric composition of claim 7.

10. A coated substrate which comprises a coating formed of a formulation comprising the block copolymer-polymer composition of claim 7.

* * * * *